(12) United States Patent
Jan et al.

(10) Patent No.: US 11,970,894 B2
(45) Date of Patent: Apr. 30, 2024

(54) DUAL-AXLE HINGE STRUCTURE

(71) Applicants: Cheng-Shiue Jan, Taipei (TW);
Jyh-Chyang Tzou, Taipei (TW);
Han-Tsai Liu, Taipei (TW)

(72) Inventors: Cheng-Shiue Jan, Taipei (TW);
Jyh-Chyang Tzou, Taipei (TW);
Han-Tsai Liu, Taipei (TW)

(73) Assignee: COMPAL ELECTRONICS, INC.,
Taipei (TW)

( * ) Notice: Subject to any disclaimer, the term of this patent is extended or adjusted under 35 U.S.C. 154(b) by 228 days.

(21) Appl. No.: 17/575,609

(22) Filed: Jan. 13, 2022

(65) Prior Publication Data

US 2022/0356739 A1    Nov. 10, 2022

Related U.S. Application Data

(60) Provisional application No. 63/197,516, filed on Jun. 7, 2021, provisional application No. 63/184,803, filed on May 6, 2021.

(51) Int. Cl.
*E05D 3/18* (2006.01)
*E05D 3/12* (2006.01)

(52) U.S. Cl.
CPC .............. *E05D 3/18* (2013.01); *E05D 3/12* (2013.01); *E05Y 2900/606* (2013.01)

(58) Field of Classification Search
CPC ........ E05D 3/18; E05D 3/12; E05Y 2900/606
See application file for complete search history.

(56) References Cited

U.S. PATENT DOCUMENTS

| 8,370,994 | B2 * | 2/2013 | Duan .................... G06F 1/1681 |
| | | | 16/303 |
| 9,003,606 | B2 * | 4/2015 | Hsu .......................... E05D 3/12 |
| | | | 16/366 |
| 9,265,166 | B2 * | 2/2016 | Hsu ....................... H05K 5/0226 |
| 9,290,976 | B1 * | 3/2016 | Horng ................... G06F 1/1618 |
| 9,388,614 | B2 * | 7/2016 | Hsu .......................... E05D 3/12 |

(Continued)

FOREIGN PATENT DOCUMENTS

CN            203655884         6/2014

OTHER PUBLICATIONS

"Office Action of China Counterpart Application", dated Aug. 1, 2023, p. 1-p. 7.

*Primary Examiner* — Robert Sandy
*Assistant Examiner* — Matthew J Sullivan
(74) *Attorney, Agent, or Firm* — JCIPRNET

(57) ABSTRACT

A double-axis hinge structure including a fixing member, a first shaft, a first guiding portion, a second shaft, a second guiding portion, and a slide guiding member is provided. The first shaft and the second shaft pass through the fixing member and the slide guiding member. The first guiding portion and the second guiding portion are respectively integrally formed on the first shaft and the second shaft. The slide guiding member has a third guiding portion and a fourth guiding portion. When one or both of the first shaft and the second shaft rotates relative to the fixing member, the guidance between the first guiding portion and the third guiding portion and/or the second guiding portion and the fourth guiding portion drives the slide guiding member to slide, so that the first shaft and the second shaft synchronously rotate in opposite directions by the same amount of rotation.

16 Claims, 18 Drawing Sheets

(56) References Cited

U.S. PATENT DOCUMENTS

| | | | |
|---|---|---|---|
| 10,747,271 B2 * | 8/2020 | Lin | E05D 3/12 |
| 10,824,197 B1 * | 11/2020 | Hsu | G06F 1/1641 |
| 11,023,017 B2 * | 6/2021 | Cheng | G06F 1/1681 |
| 11,360,523 B2 * | 6/2022 | Chen | E05D 11/08 |
| 11,447,992 B2 * | 9/2022 | Wang | G06F 1/1681 |
| 11,598,365 B2 * | 3/2023 | Lin | G06F 1/1681 |
| 2009/0001232 A1 * | 1/2009 | Seo | G06F 1/1635 248/176.1 |
| 2011/0099756 A1 * | 5/2011 | Chen | G06F 1/1681 16/297 |
| 2018/0239402 A1 * | 8/2018 | Wang | E05D 3/18 |
| 2023/0292498 A1 * | 9/2023 | Chen | H01L 21/76804 |

* cited by examiner

DUAL-AXLE HINGE STRUCTURE

CROSS-REFERENCE TO RELATED APPLICATION

This application claims the priority benefit of U.S. Provisional application Ser. No. 63/184,803, filed on May 6, 2021, and U.S. Provisional application Ser. No. 63/197,516, filed on Jun. 7, 2021. The entirety of each of the above-mentioned patent applications is hereby incorporated by reference herein and made a part of this specification.

BACKGROUND

Technical Field

The disclosure relates to a hinge structure, and in particular to a double-axis hinge structure.

Description of Related Art

Common foldable electronic devices include notebook computers, dual-screen notebook computers, foldable mobile phones, foldable tablet computers, or similar electronic products. Specifically, most common foldable electronic devices have a double-axis hinge structure to allow two bodies to be pivoted to each other. In order to allow the two bodies to synchronously rotate in opposite directions, the existing double-axis hinge structure mainly have four gears to achieve the action of the two bodies synchronously rotating in opposite directions. However, such a design occupies much volume, which does not meet the design trend of thinner and lighter foldable electronic devices.

SUMMARY

The disclosure provides a hinge structure with a small volume, which reduces the volume of a foldable electronic device that is applied.

A double-axis hinge structure of the disclosure includes a fixing member, a first shaft, a first guiding portion, a second shaft, a second guiding portion, and a slide guiding member. The first shaft passes through the fixing member. The first guiding portion is integrally formed on the first shaft. The second shaft passes through the fixing member, and is disposed side by side with the first shaft. The second guiding portion is integrally formed on the second shaft. The first shaft and the second shaft pass through the slide guiding member. The slide guiding member has a third guiding portion matched with the first guiding portion and a fourth guiding portion matched with the second guiding portion. When one or both of the first shaft and the second shaft rotate relative to the fixing member, the slide guiding member is driven to slide relative to the first shaft and the second shaft through the guidance and matching between the first guiding portion and the third guiding portion and/or between the second guiding portion and the fourth guiding portion, so that the first shaft and the second shaft synchronously rotate in opposite directions by the same amount of rotation.

In an embodiment of the disclosure, the first guiding portion, the second guiding portion, the third guiding portion, and the fourth guiding portion are respectively a helical guiding surface.

In an embodiment of the disclosure, the double-axis hinge structure further includes a first connection member and a second connection member. The first connection member is connected to the first shaft. The slide guiding member is located between the first guiding portion and the first connection member. The second connection member is connected to the second shaft. The slide guiding member is located between the second guiding portion and the second connection member. The slide guiding member has a fifth guiding portion and a sixth guiding portion. The first connection member has a seventh guiding portion corresponding to the fifth guiding portion, and the second connection member has an eighth guiding portion corresponding to the sixth guiding portion.

In an embodiment of the disclosure, the fifth guiding portion, the sixth guiding portion, the seventh guiding portion and the eighth guiding portion are respectively a helical guiding surface.

In an embodiment of the disclosure, the first guiding portion and the second guiding portion are respectively a helical convex portion, and the third guiding portion and the fourth guiding portion are respectively a helical groove.

In an embodiment of the disclosure, the slide guiding member has a first shaft hole and a second shaft hole, the third guiding portion is located in the first shaft hole, and the fourth guiding portion is located in the second shaft hole.

In an embodiment of the disclosure, the first shaft has a first positioning portion, the second shaft has a second positioning portion, the first positioning portion is located between the fixing member and the first guiding portion, and the second positioning portion is located between the fixing member and the second guiding portion.

In an embodiment of the disclosure, the double-axis hinge structure further includes another fixing member. The first shaft and the second shaft pass through the another fixing member. The slide guiding member is located between the fixing member and the another fixing member, and the slide guiding member is adapted for sliding between the fixing member and the another fixing member.

In an embodiment of the disclosure, the double-axis hinge structure further includes a torsional component. The first shaft and the second shaft pass through the torsional component, and the slide guiding member is located between the fixing member and the torsional component.

A double-axis hinge structure of the disclosure includes a fixing member, a first shaft, a first guiding portion, a second shaft, a second guiding portion, a first slide guiding member, and a second slide guiding member. The first shaft passes through the fixing member. The first guiding portion is integrally formed on the first shaft. The second shaft passes through the fixing member, and is disposed side by side with the first shaft. The second guiding portion is integrally formed on the second shaft. The first shaft passes through the first slide guiding member. The first slide guiding member has a third guiding portion matched with the first guiding portion and a sliding groove. The second shaft passes through the second slide guiding member. The second slide guiding member has a fourth guiding portion matched with the second guiding portion and a pushing portion corresponding to the sliding groove. The pushing portion is slidably disposed in the sliding groove. When one or both of the first shaft and the second shaft rotate relative to the fixing member, the pushing portion moves from a side of the sliding groove until it abuts against another side of the sliding groove, and one or both of the first shaft and the second shaft continue to rotate, so that the first slide guiding member and the second slide guiding member mutually push to drive the first slide guiding member and the second slide guiding member to slide relative to the first shaft and the second shaft, so that the first shaft and the second shaft rotate in opposite directions, and there is a difference between an amount of rotation of the first shaft and an amount of rotation of the second shaft.

In an embodiment of the disclosure, the first guiding portion, the second guiding portion, the third guiding portion, and the fourth guiding portion are respectively a helical guiding surface.

In an embodiment of the disclosure, the double-axis hinge structure further includes a first connection member and a second connection member. The first connection member is connected to the first shaft. The first slide guiding member is located between the first guiding portion and the first connection member. The second connection member is connected to the second shaft. The second slide guiding member is located between the second guiding portion and the second connection member. The first slide guiding member has a fifth guiding portion and the second slide guiding member has a sixth guiding portion. The first connection member has a seventh guiding portion corresponding to the fifth guiding portion and the second connection member has an eighth guiding portion corresponding to the sixth guiding portion.

In an embodiment of the disclosure, the fifth guiding portion, the sixth guiding portion, the seventh guiding portion, and the eighth guiding portion are respectively a helical guiding surface.

In an embodiment of the disclosure, the double-axis hinge structure further includes another fixing member. The first shaft and the second shaft pass through the another fixing member. The first slide guiding member and the second slide guiding member are located between the fixing member and the another fixing member, and the first slide guiding member and the second slide guiding member are adapted for sliding between the fixing member and the another fixing member.

In an embodiment of the disclosure, the double-axis hinge structure further includes a torsional component. The first shaft and the second shaft pass through the torsional component. The first slide guiding member and the second slide guiding member are located between the fixing member and the torsional component.

Based on the above, the double-axis hinge structure of the disclosure has a small volume, which reduces the volume of a foldable electronic device that is applied.

To provide a further understanding of the above features and advantages of the disclosure, embodiments accompanied with drawings are described below in details.

DESCRIPTION OF THE EMBODIMENTS

Figure 1:
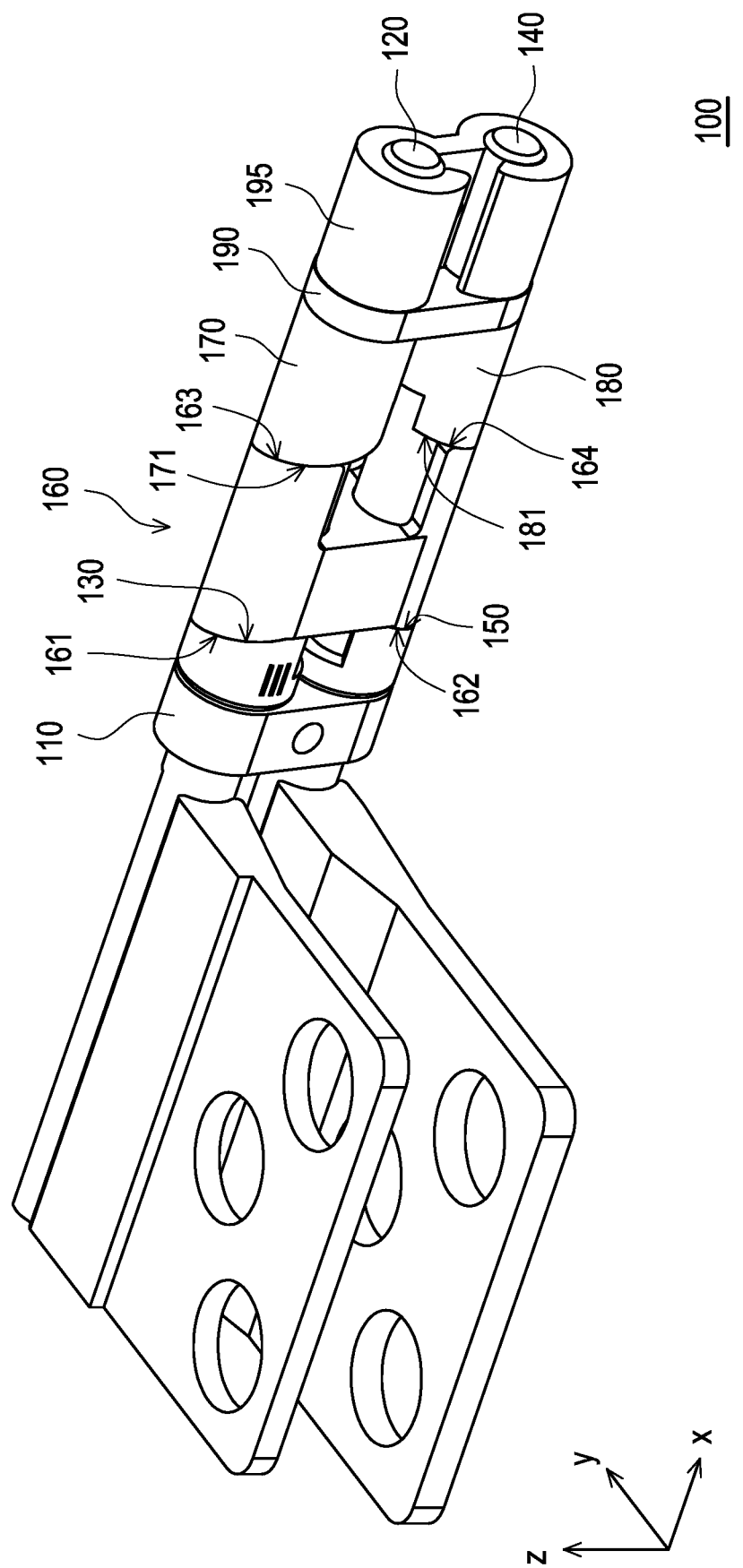
FIG. 1 is a schematic perspective view of a double-axis hinge structure according to the first embodiment of the disclosure.
Figure 2:
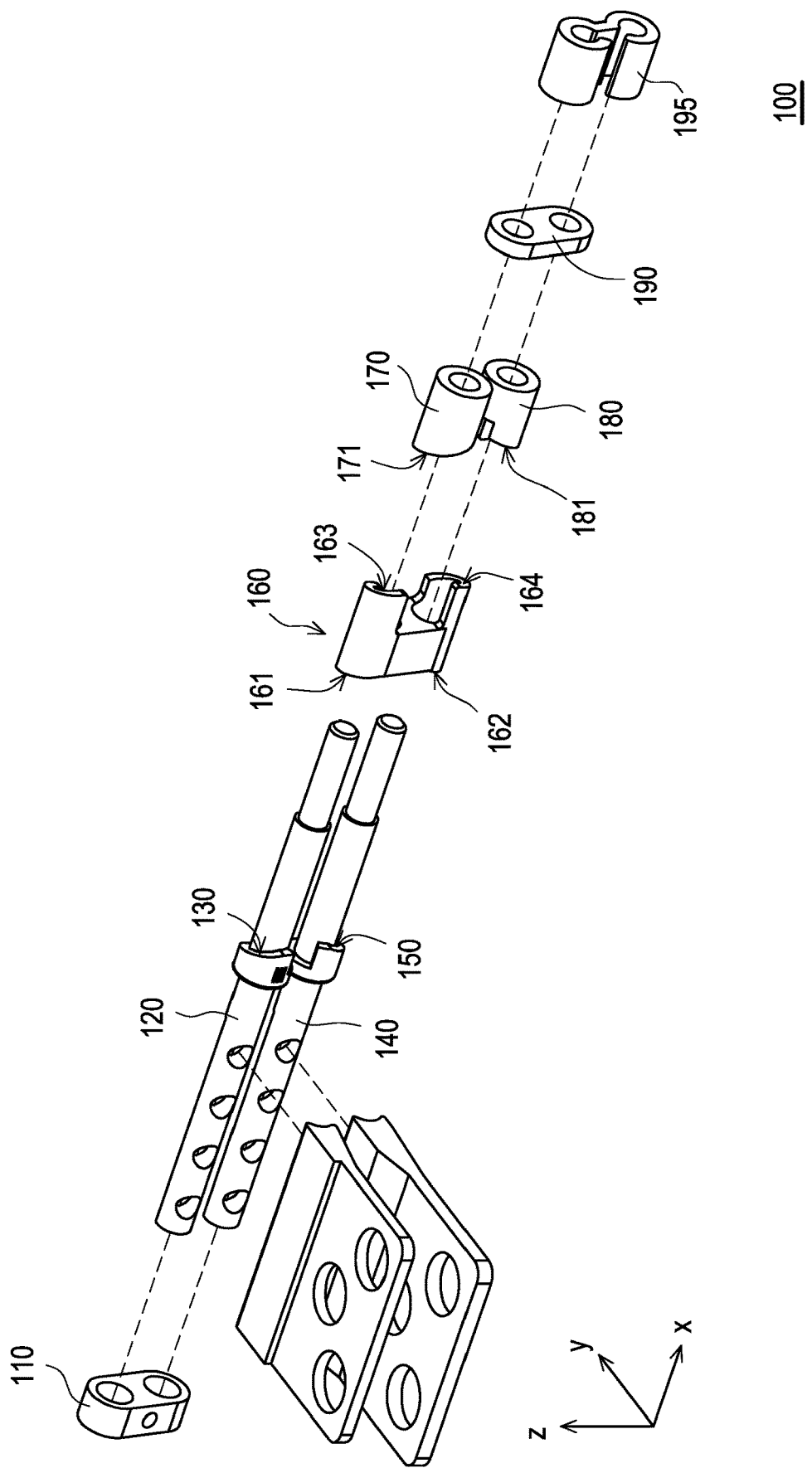
FIG. 2 is a schematic exploded view of the double-axis hinge structure of FIG. 1.
Figure 3:
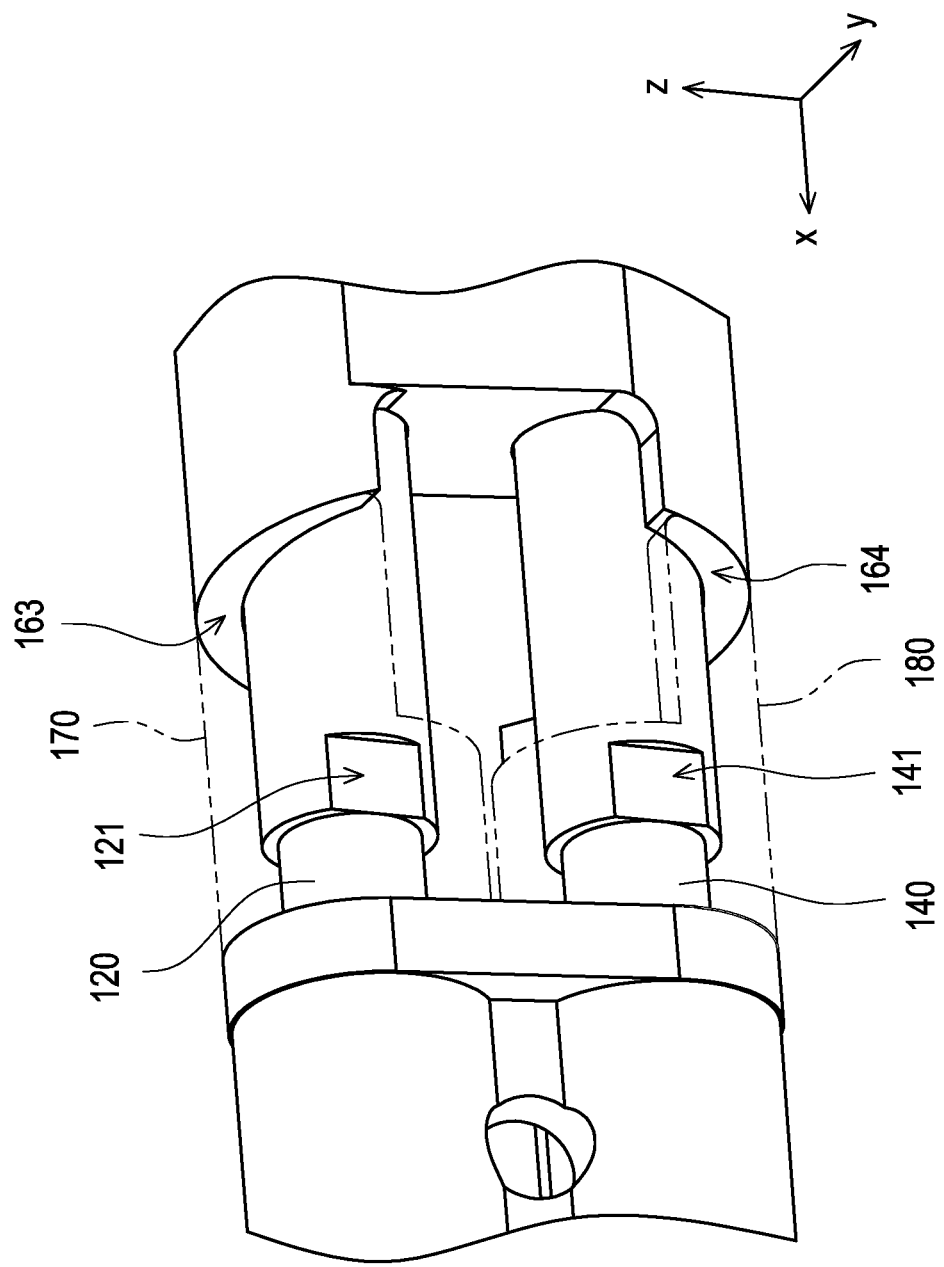
FIG. 3 is a schematic enlarged view of a portion of the double-axis hinge structure of FIG. 1.
Figure 5:
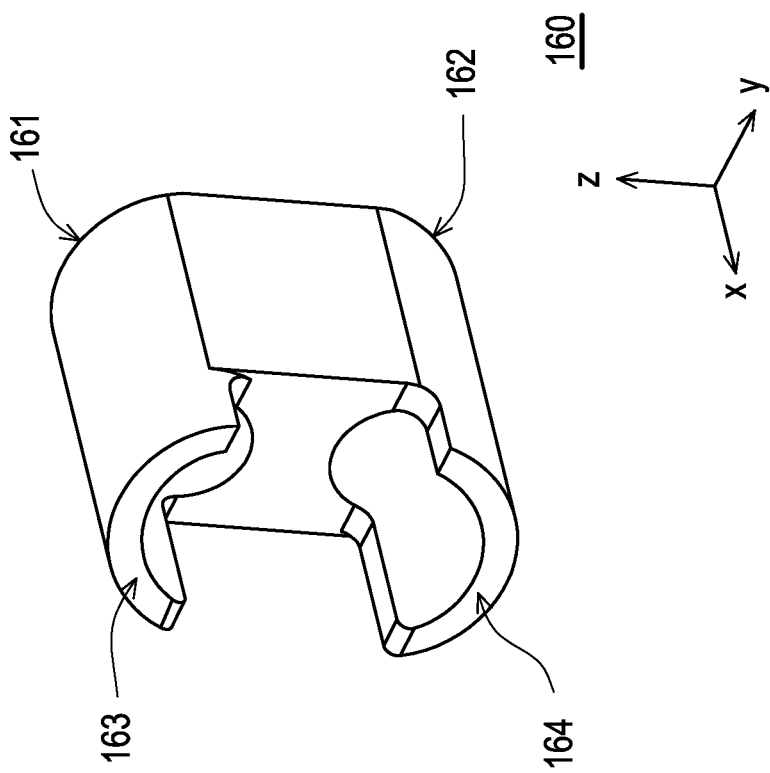
FIGS. 4 and 5 are schematic perspective views of a slide guiding member of FIG. 2 in different angles of views.
Figure 4:
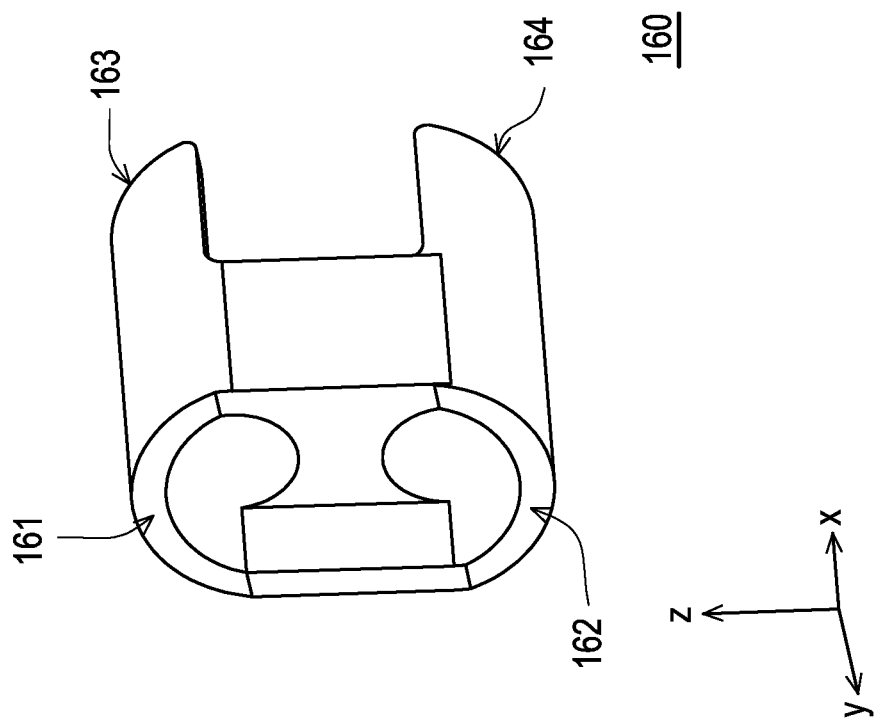

FIG. 1 is a schematic perspective view of a double-axis hinge structure according to the first embodiment of the disclosure. FIG. 2 is a schematic exploded view of the double-axis hinge structure of FIG. 1. FIG. 3 is a schematic enlarged view of a portion of the double-axis hinge structure of FIG. 1. FIGS. 4 and 5 are schematic perspective views of a slide guiding member of FIG. 2 in different angles of views. At the same time, Cartesian coordinates x-y-z are provided in order to illustrate the angle of view relationship between each figure. Referring to FIG. 1, FIG. 2, FIG. 4, and FIG. 5, a double-axis hinge structure 100 of this embodiment is adapted for a foldable electronic device, such as a notebook computer, a dual-screen notebook computer, a foldable phone, a foldable tablet computer, or a similar electronic product. The double-axis hinge structure 100 includes a fixing member 110, a first shaft 120, a first guiding portion 130, a second shaft 140, a second guiding portion 150, and a slide guiding member 160.

Specifically, the first shaft 120 and the second shaft 140 both pass through the fixing member 110 and the slide guiding member 160, and the second shaft 140 and the first shaft 120 are disposed side by side. The first guiding portion 130 is integrally formed on the first shaft 120, and the second guiding portion 150 is integrally formed on the second shaft 140. The slide guiding member 160 has a third guiding portion 161 matched with the first guiding portion 130 and a fourth guiding portion 162 matched with the second guiding portion 150.

In this embodiment, when one or both of the first shaft 120 and the second shaft 140 rotate relative to the fixing member 110, the guidance and matching between the first guiding portion 130 and the third guiding portion 161 and/or the second guiding portion 150 and the fourth guiding portion 162 drive the slide guiding member 160 to slide relative to the first shaft 120 and the second shaft 140, so that the first shaft 120 and the second shaft 140 synchronously rotate in opposite directions by the same amount of rotation. Therefore, the double-axis hinge structure 100 of the disclosure does not require four gears as in the traditional way, so it has a smaller volume, which reduces the volume of the foldable electronic device that is applied.

Referring to FIG. 1, FIG. 2 and FIG. 3, the double-axis hinge structure 100 further includes a first connection member 170, a second connection member 180, another fixing member 190 and a torsional component 195.

The first shaft 120 has a first engaging surface 121, and the first connection member 170 is engaged with the first engaging surface 121 of the first shaft 120 to synchronously rotate with the first shaft 120. The second shaft 140 has a second engaging surface 141, and the second connection member 180 is engaged with the second engaging surface 141 of the second shaft 140 to synchronously rotate with the second shaft 140.

The slide guiding member 160 has a fifth guiding portion 163 and a sixth guiding portion 164. The first connection member 170 has a seventh guiding portion 171 corresponding to the fifth guiding portion 163, and the second connection member 180 has an eighth guiding portion 181 corresponding to the sixth guiding portion 164. In this embodiment, the first guiding portion 130, the second guiding portion 150, the third guiding portion 161, the fourth guiding portion 162, the fifth guiding portion 163, the sixth guiding portion 164, the seventh guiding portion 171, and the eighth guiding portion 181 are respectively a helical guiding surface. Here, the helical guiding surfaces are defined as guiding surfaces surrounding their respective shaft in a helical pattern. Taking the content shown in the figures as an example, the helical guiding surfaces surround the x-axis in a helical pattern.

The slide guiding member 160 is located between the fixing member 110 and the torsional component 195. The slide guiding member 160 is located between the fixing member 110 and another fixing member 190, and the slide guiding member 160 is adapted for sliding between the fixing member 110 and said another fixing member 190. The first connection member 170 and the second connection member 180 are located between the slide guiding member 160 and another fixing member 190. Said another fixing member 190 is located between the first connection member 170 and the torsional component 195, and said another fixing member 190 is located between the second connection member 180 and the torsional component 195. The torsional component 195 provides the torque for rotation of the first shaft 120 and the second shaft 140.

The slide guiding member 160 may be slidably located between the first guiding portion 130 and the seventh guiding portion 171 of the first connection member 170, and the slide guiding member 160 may be slidably located between the second guiding portion 150 and the eighth guiding portion 181 of the second connection member 180. The first shaft 120 and second shaft 140 pass through said another fixing member 190 and the torsional component 195.

Figure 6:
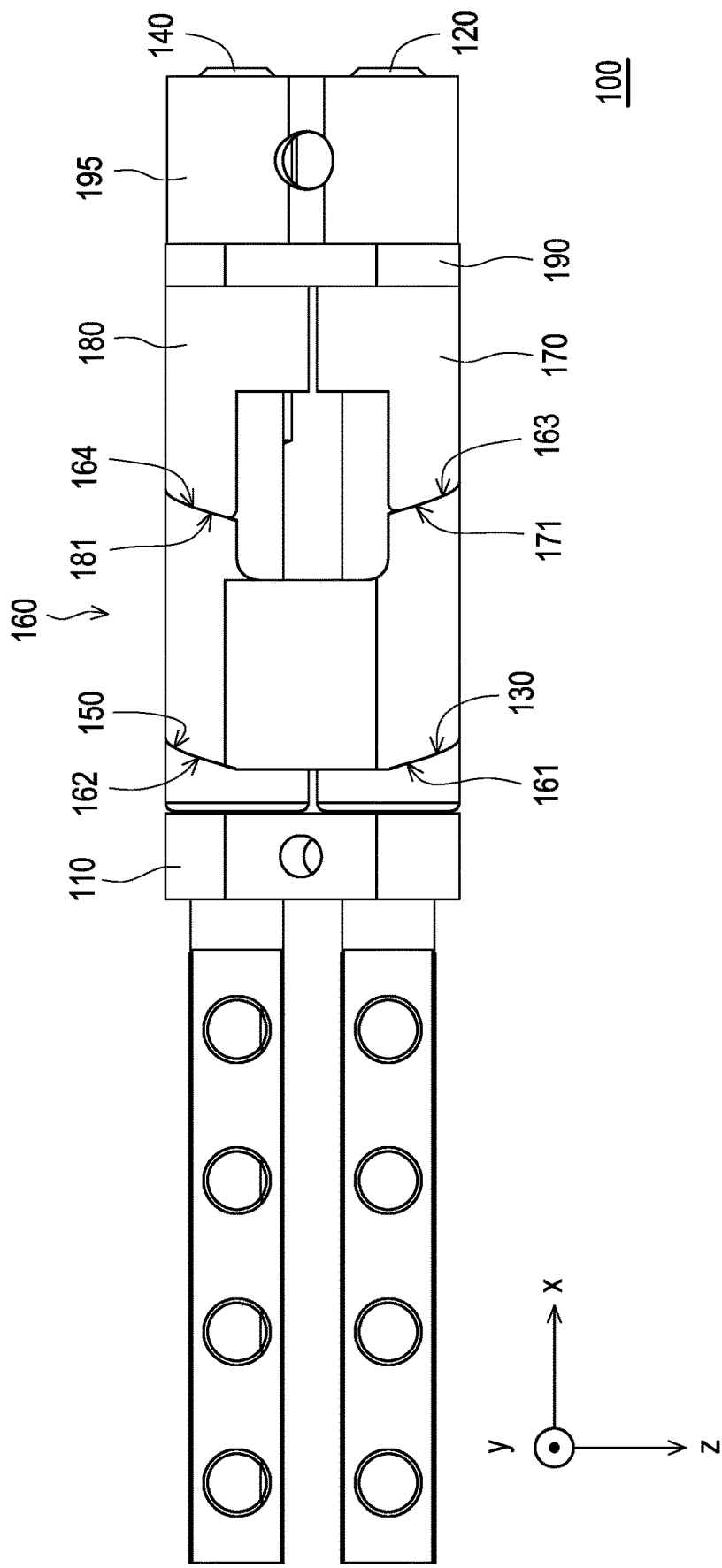
FIG. 6 is a schematic front view of the double-axis hinge structure of FIG. 1.
Figure 7:
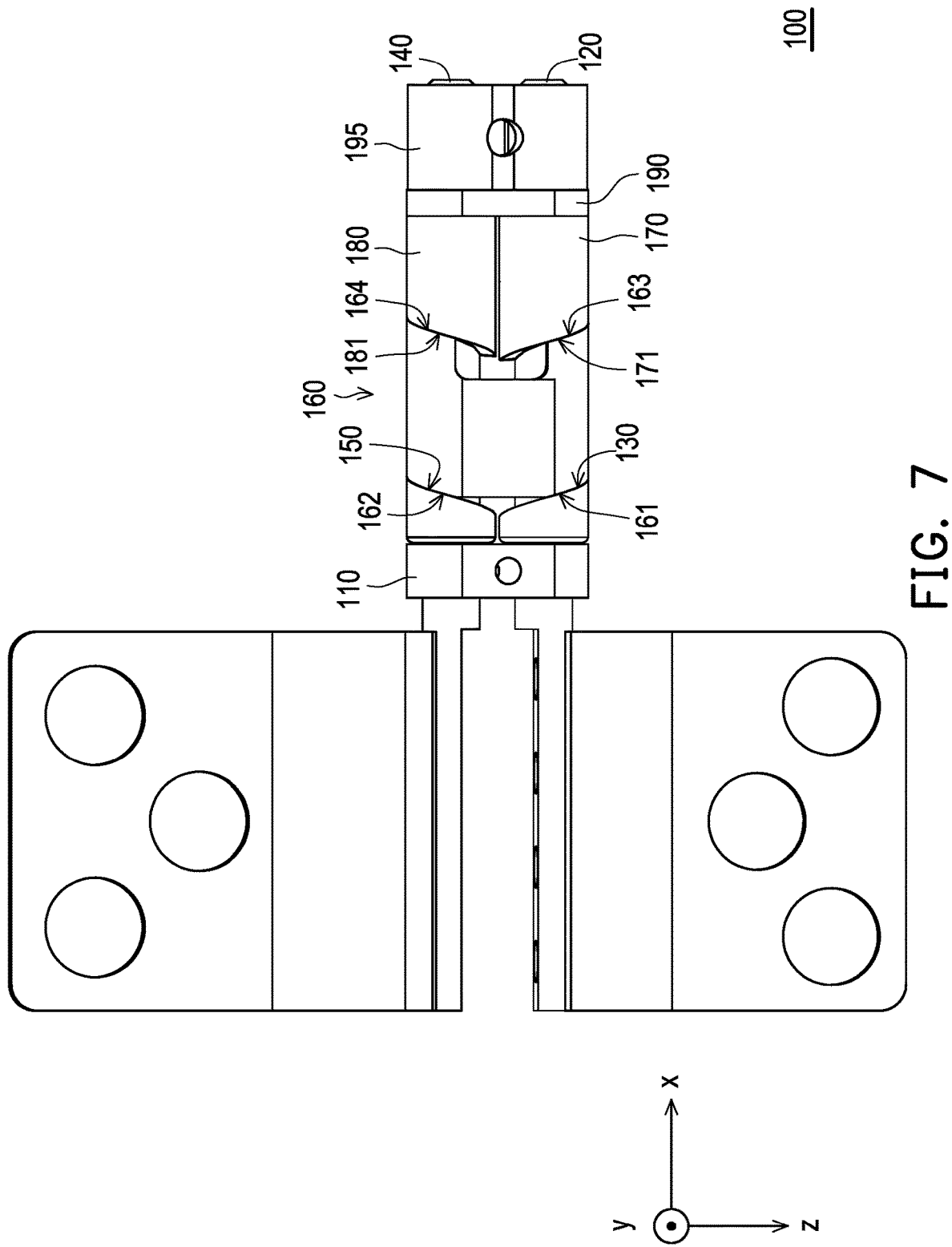
FIG. 7 is a schematic view of the double-axis hinge structure of FIG. 6 being converted to another mode.
Figure 8:
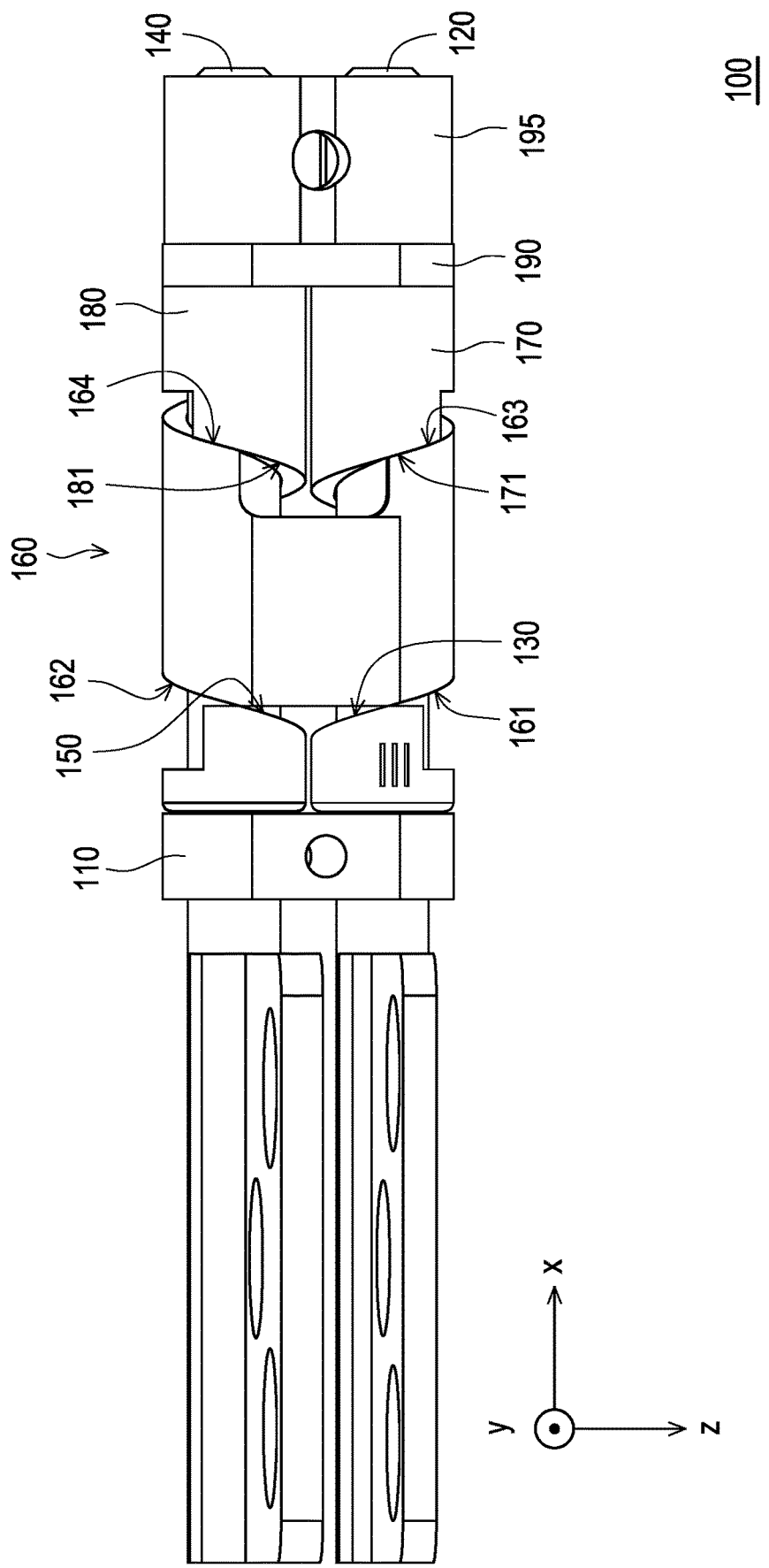
FIG. 8 is a schematic view of the double-axis hinge structure of FIG. 7 being converted to yet another mode.

FIG. 6 is a schematic front view of the double-axis hinge structure of FIG. 1, which is in the initial mode (the angle is 0 degrees) before the double-axis hinge structure rotates. FIG. 7 is a schematic view of the double-axis hinge structure of FIG. 6 being converted to another mode, in which the angle of the double-axis hinge structure is 180 degrees. FIG. 8 is a schematic view of the double-axis hinge structure of FIG. 7 being converted to yet another mode, showing that the angle of the double-axis hinge structure is 360 degrees. Referring to FIG. 1, FIG. 2, FIG. 6 and FIG. 7, in the process of converting the double-axis hinge structure 100 from being in the mode shown in FIG. 6 to being in the mode shown in FIG. 7, one or both of the first shaft 120 and the second shaft 140 rotate relative to the fixing member 110, the first guiding portion 130 allows the slide guiding member 160 to slide by pushing the third guiding portion 161, the second guiding portion 150 allows the slide guiding member 160 to slide by pushing the fourth guiding portion 162, the fifth guiding portion 163 slides relatively on the seventh guiding portion 171, and the sixth guiding portion 164 relatively slides on the eighth guiding portion 181, so that the first shaft 120 and the second shaft 140 may synchronously rotate in opposite directions by the same amount of rotation. In other words, the slide guiding member 160 only moves on the x-axis, and the first connection member 170 and the second connection member 180 respectively rotate in opposite directions on the x-axis along with the first shaft 120 and the second shaft 140, but do not move on the x-axis.

Further referring to FIG. 8, in the process of converting the double-axis hinge structure 100 from being in the mode shown in FIG. 7 to being in the mode shown in FIG. 8, the first guiding portion 130 continues to allow the slide guiding member 160 to slide by pushing the third guiding portion 161, the second guiding portion 150 continues to allow the slide guiding member 160 to slide by pushing the fourth guiding portion 162, the fifth guiding portion 163 continues to slide relative to the seventh guiding portion 171, and the sixth guiding portion 164 continues to slide relatively on the eighth guiding portion 181, so that the first shaft 120 and the second shaft 140 may continuously rotate in opposite directions by the same amount of rotation. Therefore, the slide guiding member 160 only moves on the x-axis, too.

Figure 9:
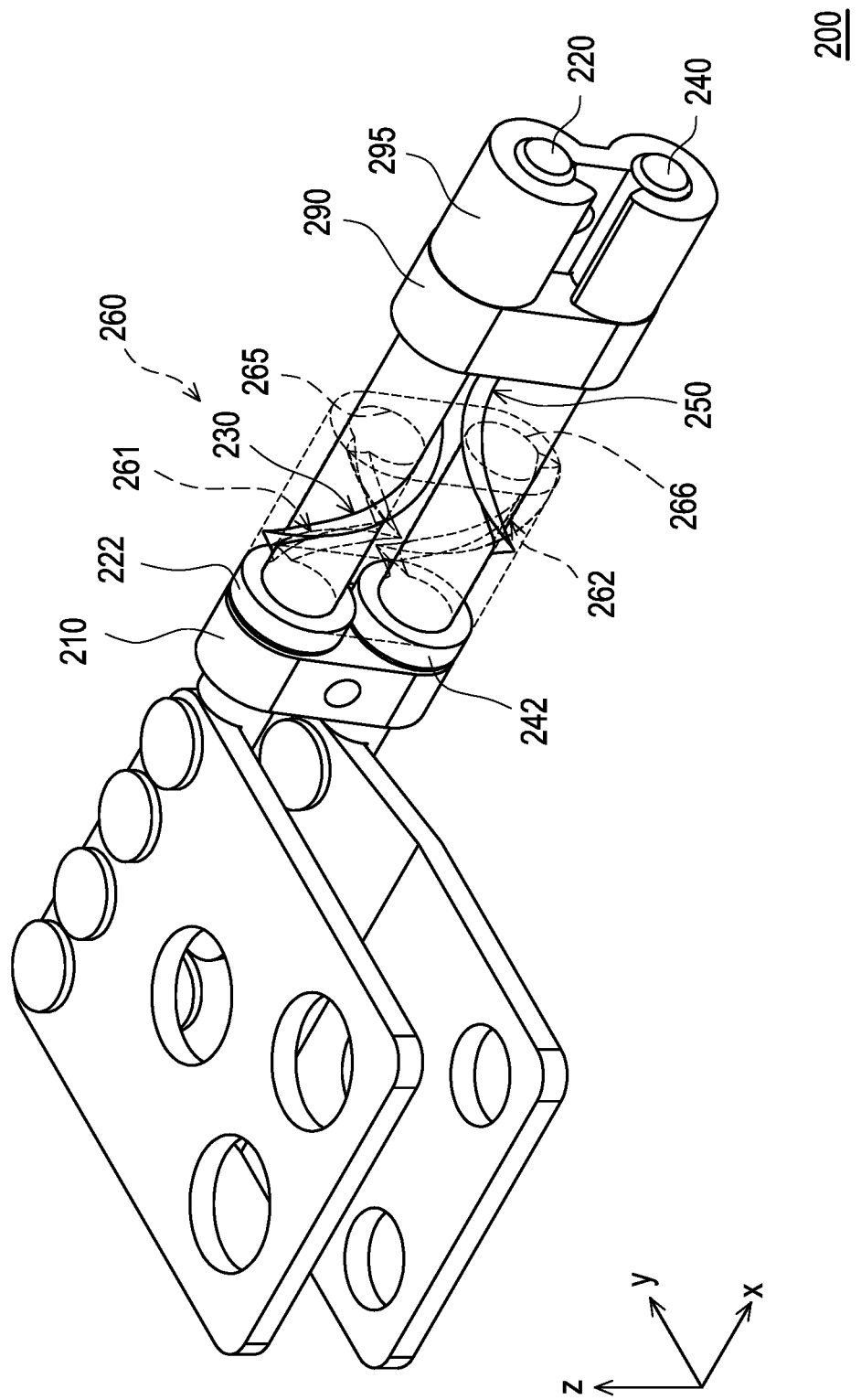
FIG. 9 is a schematic perspective view of a double-axis hinge structure according to the second embodiment of the disclosure.
Figure 10:
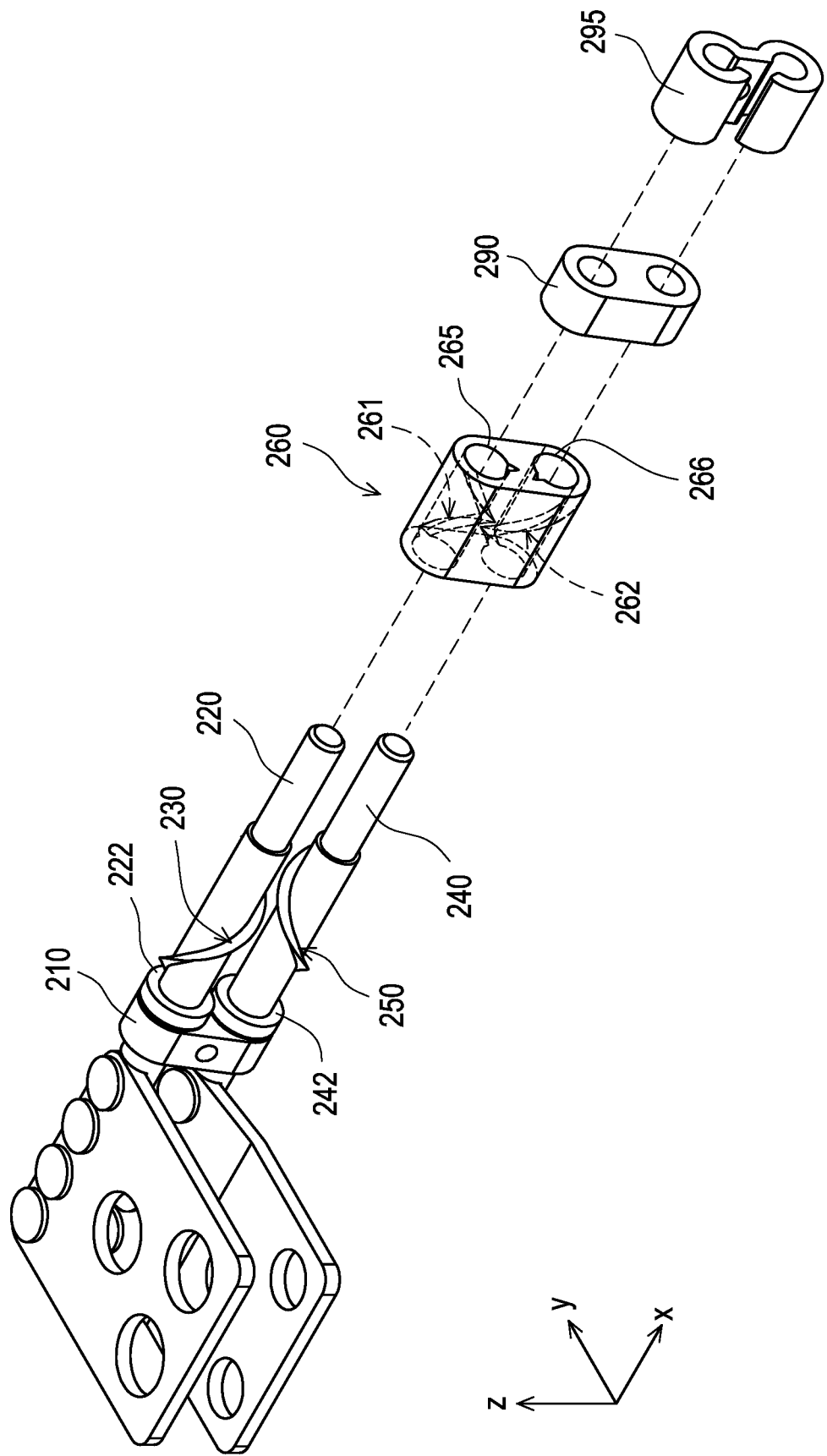
FIG. 10 is a schematic exploded view of the double-axis hinge structure of FIG. 9.
Figure 11:
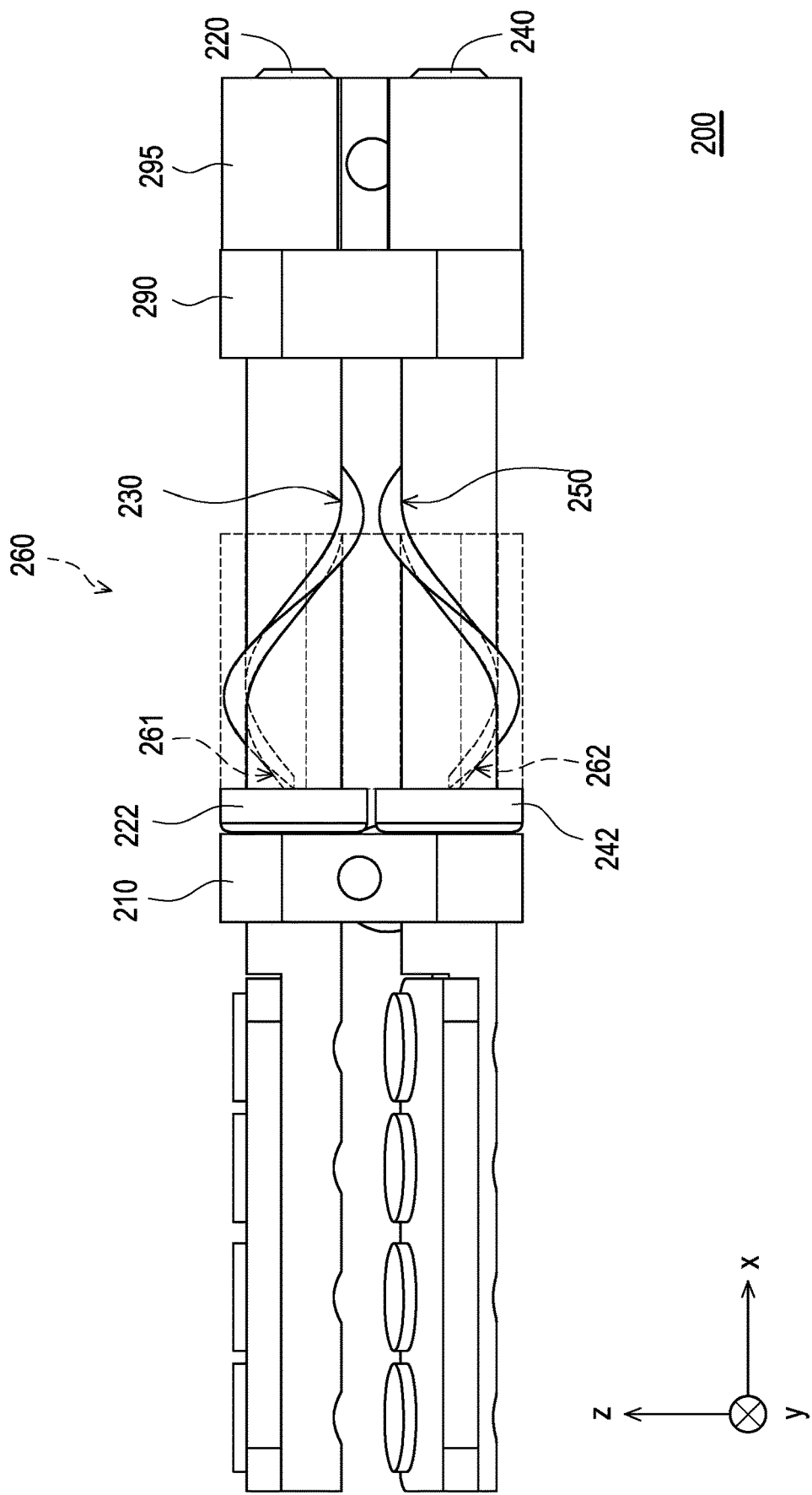
FIG. 11 is a schematic front view of the double-axis hinge structure of FIG. 9.
Figure 12:
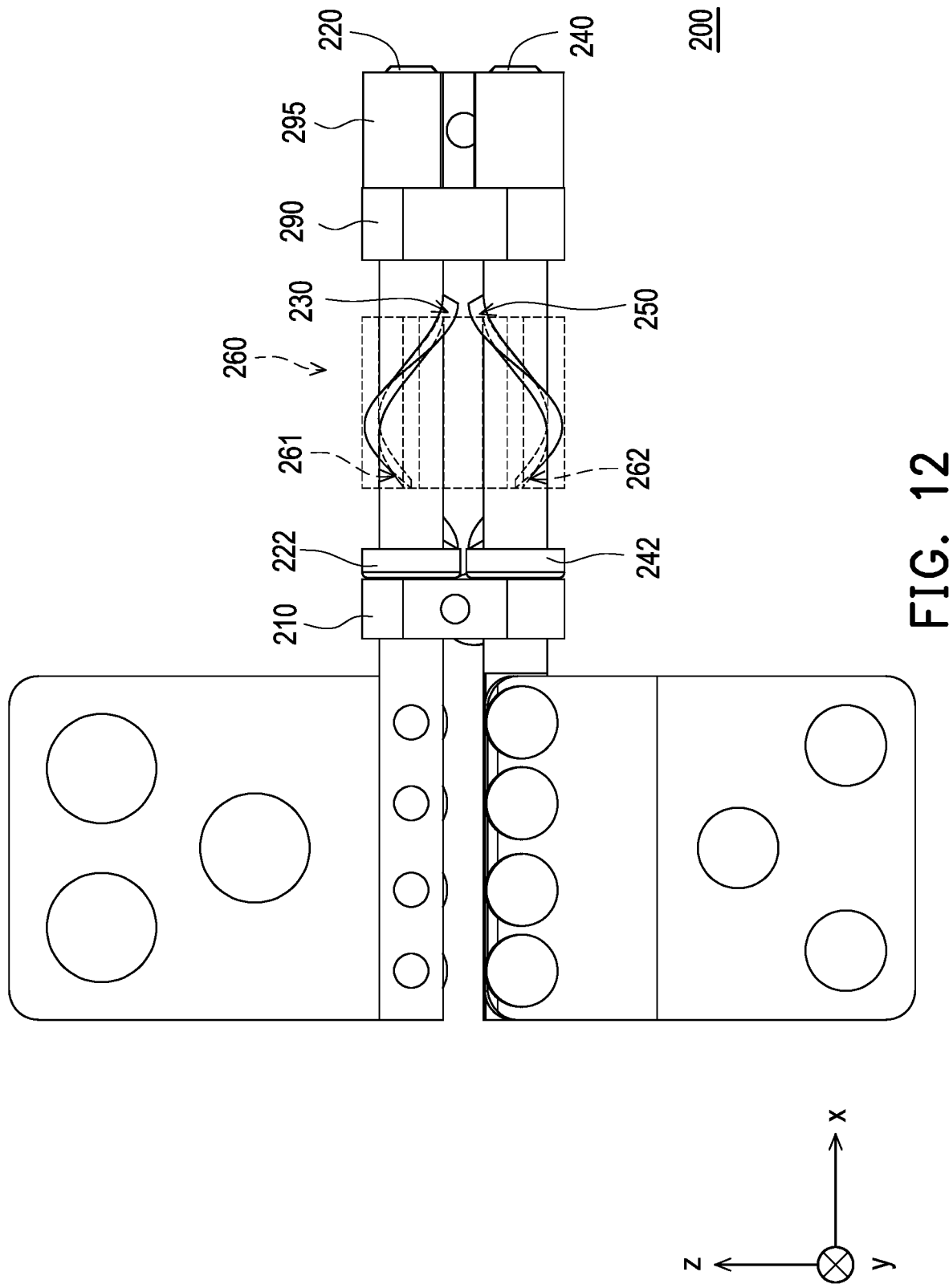
FIG. 12 is a schematic view of the double-axis hinge structure of FIG. 11 being converted to another mode.
Figure 13:
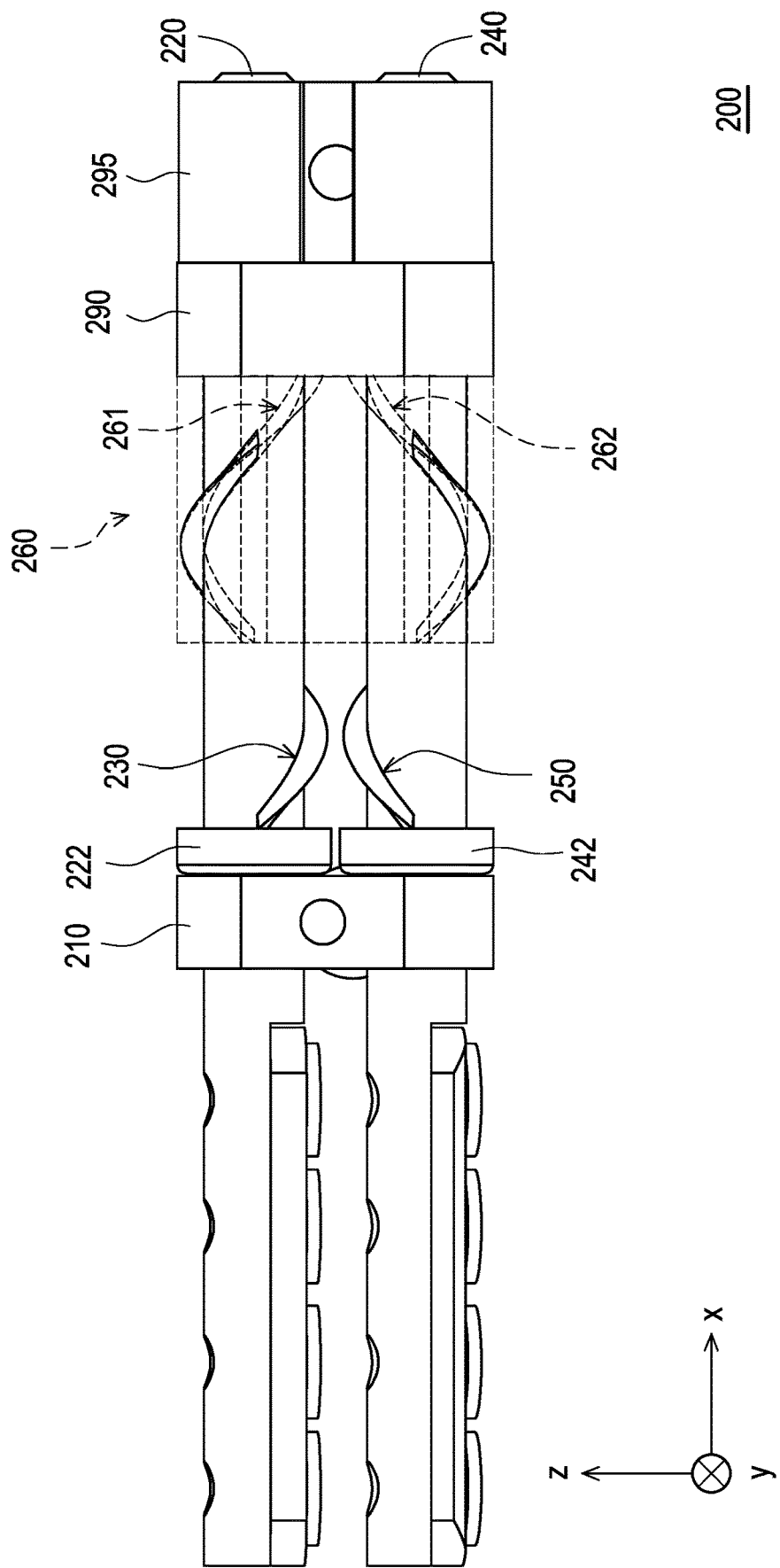
FIG. 13 is a schematic view of the double-axis hinge structure of FIG. 12 being converted to yet another mode.

FIG. 9 is a schematic perspective view of a double-axis hinge structure according to the second embodiment of the disclosure. FIG. 10 is a schematic exploded view of the double-axis hinge structure of FIG. 9. FIG. 11 is a schematic front view of the double-axis hinge structure of FIG. 9, showing the initial mode (the angle is 0 degrees) before the double-axis hinge structure rotates. FIG. 12 is a schematic view of the double-axis hinge structure of FIG. 11 being converted to another mode, in which the angle of the double-axis hinge structure is 180 degrees. FIG. 13 is a schematic view of the double-axis hinge structure of FIG. 12 being converted to yet another mode, in which the angle of the double-axis hinge structure is 360 degrees. Cartesian coordinates x-y-z are provided in order to illustrate the angle of view relationship between each figure. Referring to FIG. 9, FIG. 10 and FIG. 11, a double-axis hinge structure 200 of this embodiment includes a fixing member 210, a first shaft 220, a first guiding portion 230, a second shaft 240, a second guiding portion 250, and a slide guiding member 260.

Specifically, both the first shaft 220 and the second shaft 240 pass through the fixing member 210 and the slide guiding member 260, and the second shaft 240 and the first shaft 220 are disposed side by side. The first guiding portion 230 is integrally formed on the first shaft 220, and the second guiding portion 250 is integrally formed on the second shaft 240. The slide guiding member 260 has a third guiding portion 261 matched with the first guiding portion 230 and a fourth guiding portion 262 matched with the second guiding portion 250.

In this embodiment, when one or both of the first shaft 220 and the second shaft 240 rotate relative to the fixing member 210, through the guidance and matching between the first guiding portion 230 and the third guiding portion 261 and/or between the second guiding portion 250 and the fourth guiding portion 262, the slide guiding member 260 is driven to slide relative to the first shaft 220 and the second shaft 240, so that the first shaft 220 and the second shaft 240 synchronously rotate in opposite directions by the same amount of rotation. Therefore, the double-axis hinge structure 200 of the disclosure does not require four gears as in the traditional way, so it has a smaller volume, which reduces the volume of the foldable electronic device that is applied.

The first shaft 220 has an integrally formed first positioning portion 222, and the second shaft 240 has an integrally formed second positioning portion 242. The first positioning portion 222 is located between the fixing member 210 and the first guiding portion 230, and the second positioning portion 242 is located between the fixing member 210 and the second guiding portion 250.

The slide guiding member 260 has a first shaft hole 265 and a second shaft hole 266. The third guiding portion 261 is located in the first shaft hole 265, and the fourth guiding portion 262 is located in the second shaft hole 266. The first guiding portion 230 and the second guiding portion 250 are respectively a helical convex portion, and the third guiding portion 261 and the fourth guiding portion 262 are respectively a helical groove. Taking the content shown in the figures as an example, the first guiding portion 230, the second guiding portion 250, the third guiding portion 261, and the fourth guiding portion 262 respectively surround the x-axis in a helical pattern, but the disclosure is not limited thereto.

The double-axis hinge structure 200 further includes another fixing member 290 and a torsional component 295. The slide guiding member 260 is located between the fixing member 210 and the torsional component 295. The slide guiding member 260 is located between the fixing member 210 and said another fixing member 290, and the slide guiding member 260 is adapted for sliding between the fixing member 210 and said another fixing member 290. The torsional component 295 provides the torque for rotation of the first shaft 220 the and second shaft 240.

Referring to FIG. 10, FIG. 11, FIG. 12 and FIG. 13, in the process of converting the double-axis hinge structure 200 from being in the mode shown in FIG. 11 to being in the mode shown in FIG. 12 and from being in the mode shown in FIG. 12 to being in the mode shown in FIG. 13, the first guiding portion 230 allows the slide guiding member 260 to slide through the third guiding portion 261, the second guiding portion 250 allows the slide guiding member 260 to slide through the fourth guiding portion 262, so that the first shaft 220 and the second shaft 240 synchronously rotate in opposite directions by the same amount of rotation. In other words, the slide guiding member 260 only moves on the x-axis.

Figure 14:
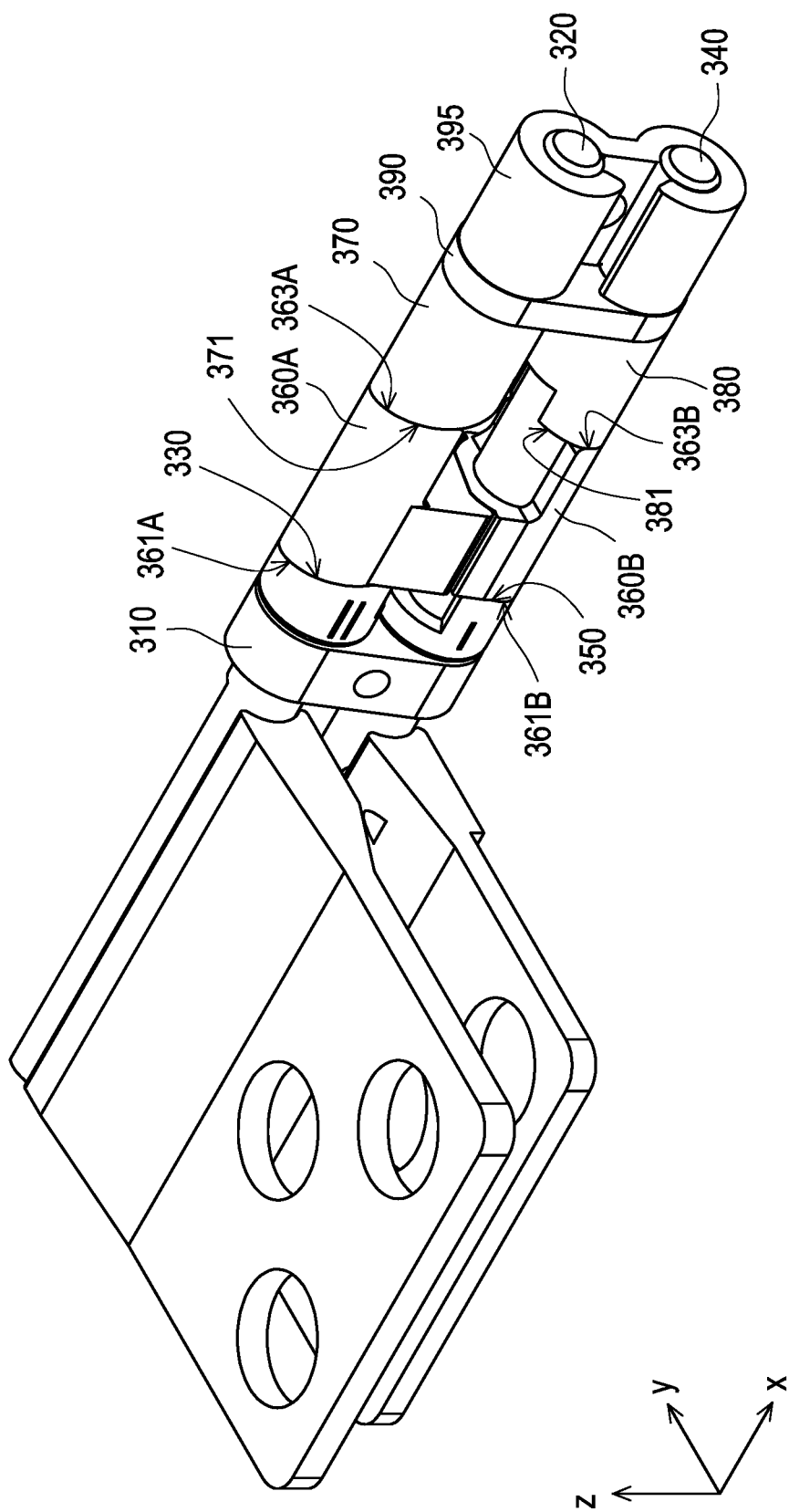
FIG. 14 is a schematic perspective view of the double-axis hinge structure according to the third embodiment of the disclosure.
Figure 15:
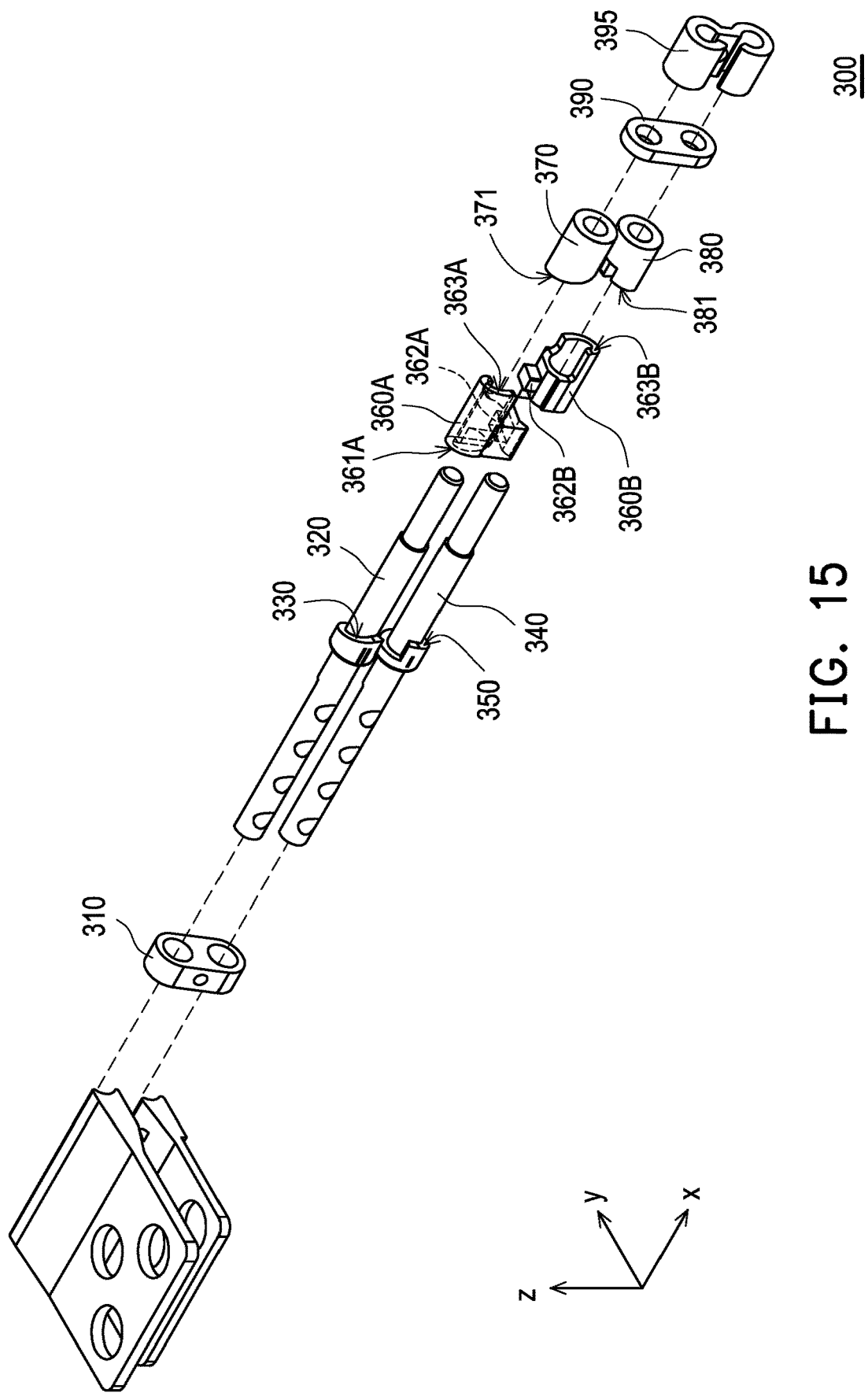
FIG. 15 is a schematic exploded view of the double-axis hinge structure of FIG. 14.
Figure 16:
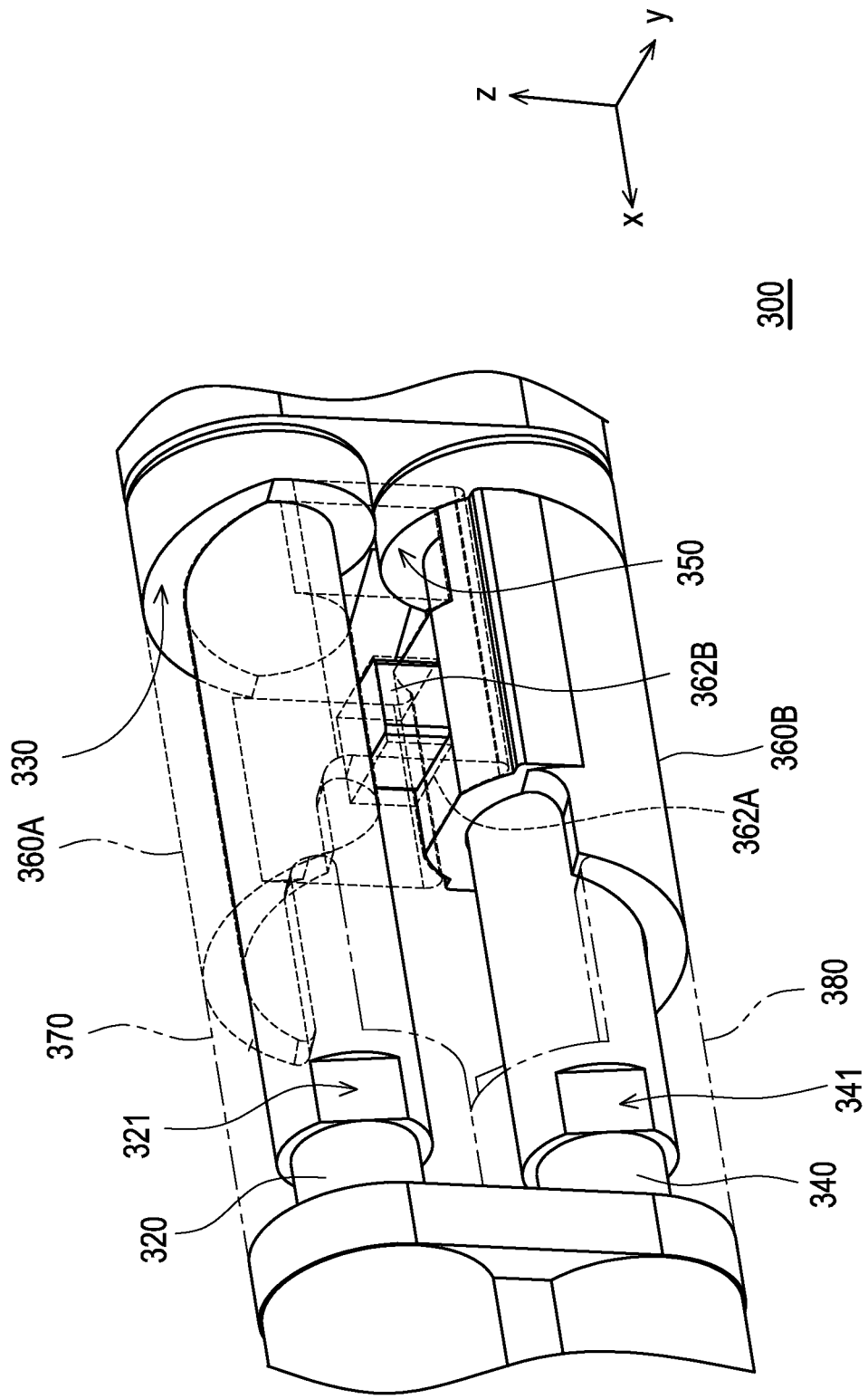
FIG. 16 is a schematic enlarged view of a portion of the double-axis hinge structure of FIG. 14.
Figure 17:
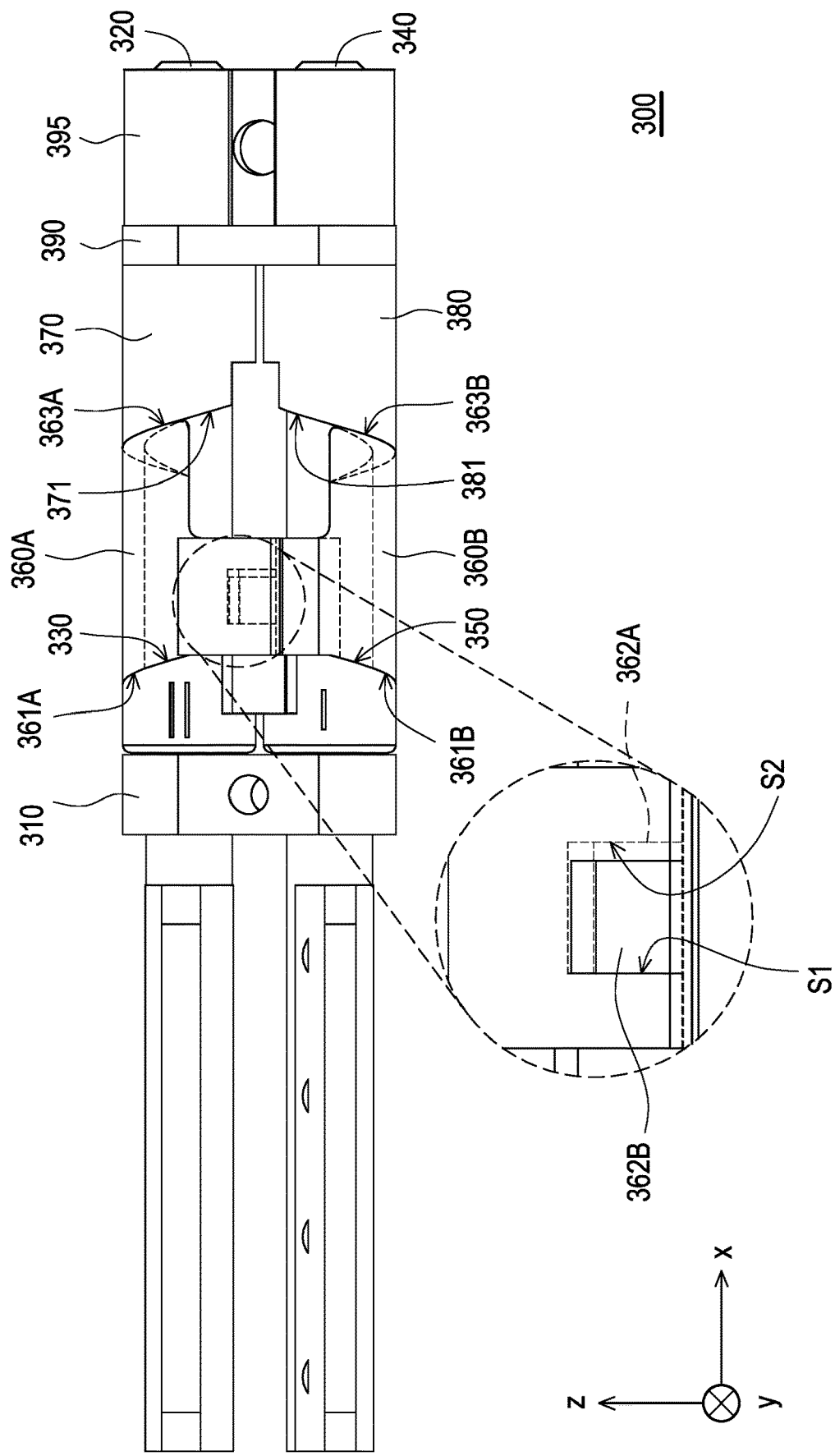
FIG. 17 is a schematic front view of the double-axis hinge structure of FIG. 14.
Figure 18:
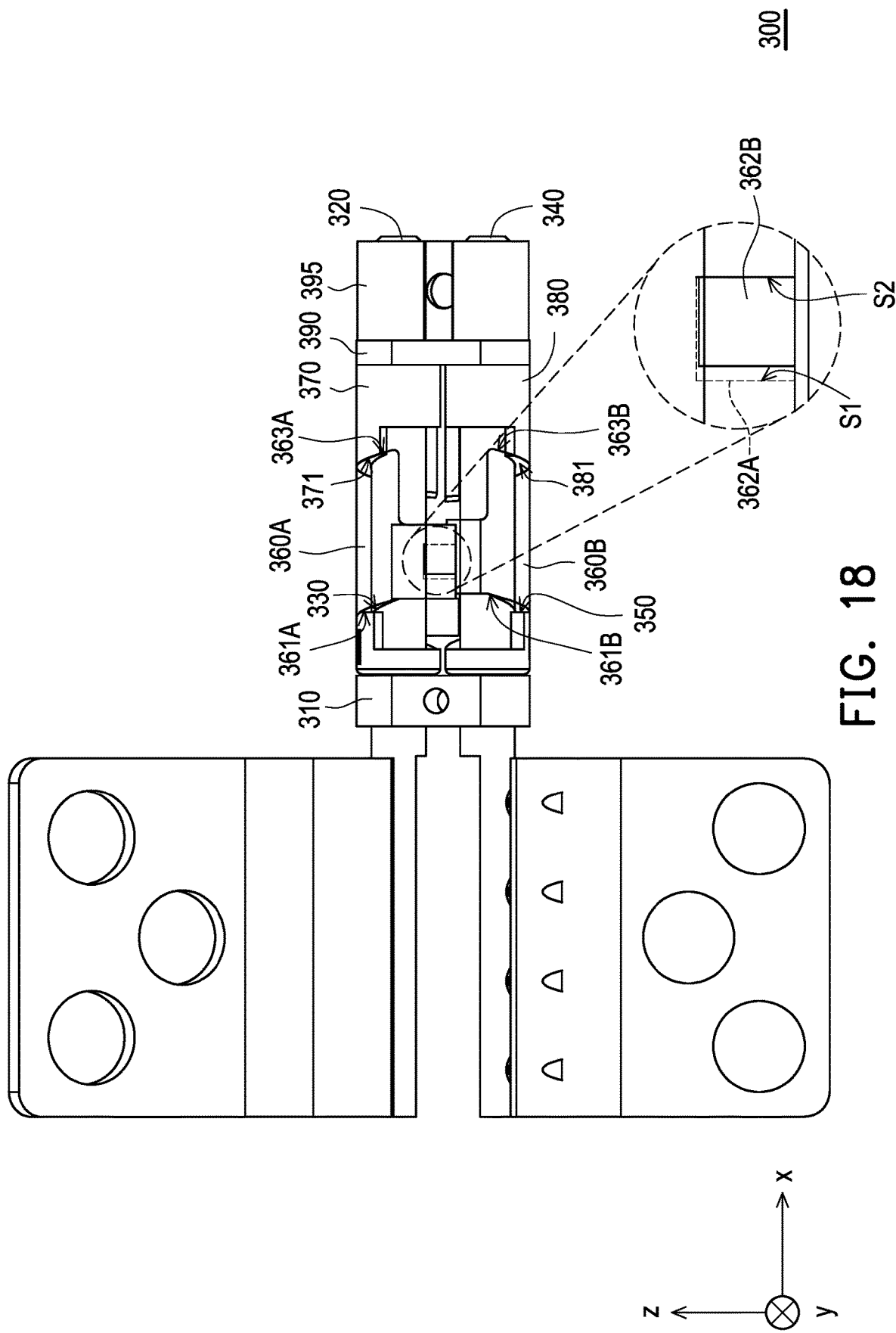
FIG. 18 is a schematic view of the double-axis hinge structure of FIG. 17 being converted to another mode.
Figure 19:
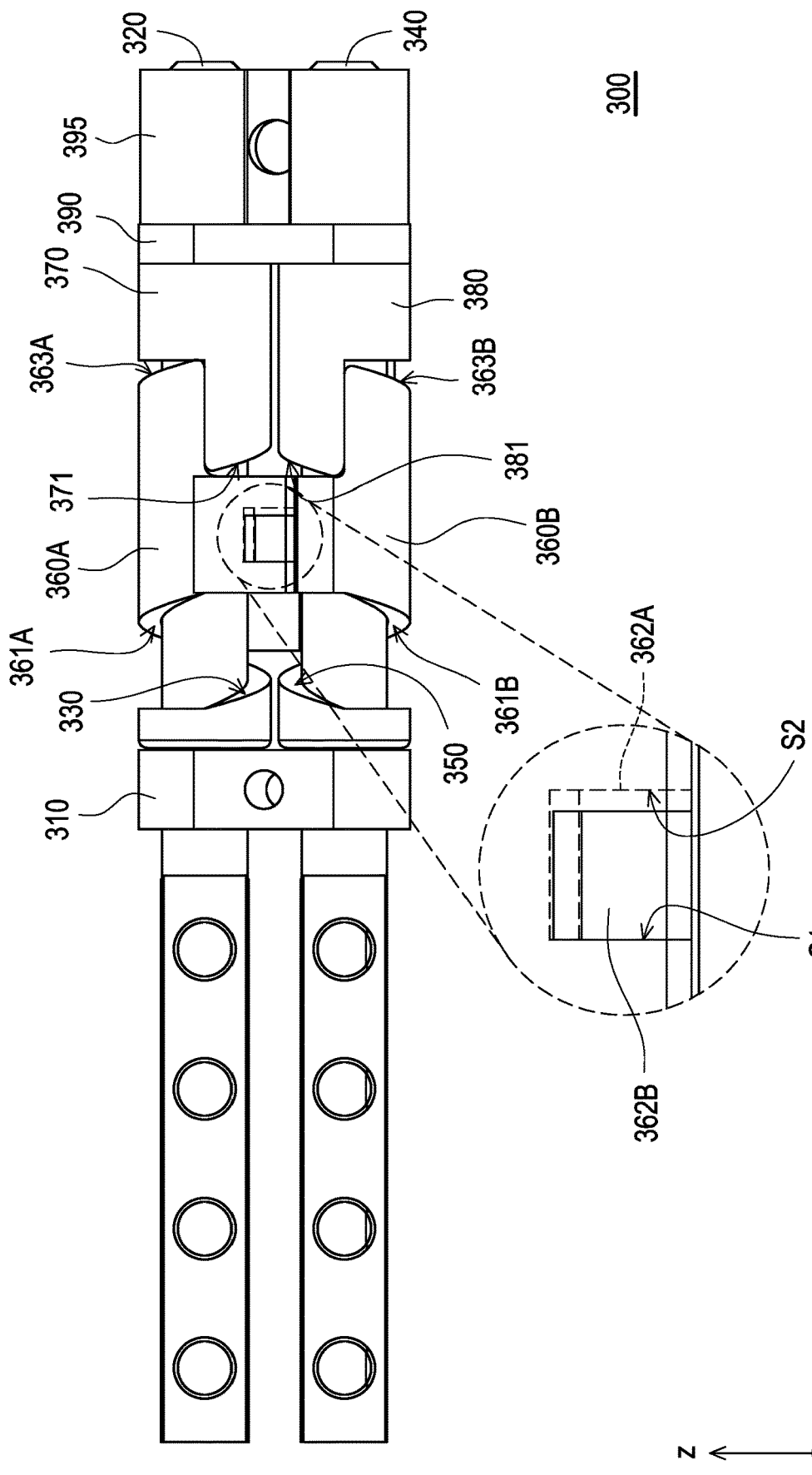
FIG. 19 is a schematic view of the double-axis hinge structure of FIG. 18 being converted to yet another mode.

FIG. 14 is a schematic perspective view of the double-axis hinge structure according to the third embodiment of the disclosure. FIG. 15 is a schematic exploded view of the double-axis hinge structure of FIG. 14. FIG. 16 is a schematic enlarged view of a portion of the double-axis hinge structure of FIG. 14. FIG. 17 is a schematic front view of the double-axis hinge structure of FIG. 14, showing the initial mode (the angle is 0 degrees) before the double-axis hinge structure rotates. FIG. 18 is a schematic view of the double-axis hinge structure of FIG. 17 being converted to another mode, in which the angle of the double-axis hinge structure is 156 degrees. FIG. 19 is a schematic view of the double-axis hinge structure of FIG. 18 being converted to yet another mode, in which the angle of the double-axis hinge structure is 360 degrees. Cartesian coordinates x-y-z are provided in order to illustrate the angle of view relationship between each figure. Referring to FIG. 14, FIG. 15, and FIG. 16, a double-axis hinge structure 300 of this embodiment includes a fixing member 310, a first shaft 320, a first guiding portion 330, a second shaft 340, a second guiding portion 350, a first slide guiding member 360A, and a second slide guiding member 360B.

Specifically, both the first shaft 320 and the second shaft 340 pass through the fixing member 310, and the first shaft 320 and the second shaft 340 are arranged side by side. The first guiding portion 330 is integrally formed on the first shaft 320, and the second guiding portion 350 is integrally formed on the second shaft 340. The first shaft 320 passes through the first slide guiding member 360A, and the second shaft 340 passes through the second slide guiding member 360B. The first slide guiding member 360A has a third guiding portion 361A matched with the first guiding portion 330 and a sliding groove 362A. The second slide guiding member 360B has a fourth guiding portion 361B matched with the second guiding portion 350 and a pushing portion 362B corresponding to the sliding groove 362A, and the pushing portion 362B is slidably disposed in the sliding groove 362A.

Referring to FIG. 15, FIG. 17, FIG. 18 and FIG. 19, when one or both of the first shaft 320 and the second shaft 340 rotate relative to the fixing member 310, the pushing portion 362B first slides and then abuts against and contacts the sliding groove 362A to allow the first slide guiding member 360A and the second slide guiding member 360B to mutually push, so as to drive the first slide guiding member 360A and the second slide guiding member 360B to slide relative to the first shaft 320 and the second shaft 340. It should be noted that, like the first embodiment and the second embodiment, this embodiment allows the first shaft 320 and the second shaft 340 to rotate in opposite directions; and different from the first embodiment and the second embodiment, this embodiment may provide a difference between the amount of rotation of the first shaft 320 and the amount of rotation of the second shaft 340.

In other words, through the difference between the sliding distance of the pushing portion 362B and the sliding distance of the sliding groove 362A, there is a certain idle stroke in the movement of one of the first slide guiding member 360A and the second slide guiding member 360B, so that after one of the first shaft 320 and the second shaft 340 rotates a certain amount, the first shaft 320 and the second shaft 340 start to rotate in opposite directions synchronously. Therefore, the double-axis hinge structure 300 of the disclosure does not require four gears as in the traditional method and thus has a smaller volume, which reduces the volume of the foldable electronic device that is applied.

On the other hand, the most obvious effects of the idle stroke are the following. In the process of rotation from 0 degree to 360 degrees (sequentially from the rotation direction of FIG. 17 to FIG. 19), the second shaft 340 is more likely to cause rotation, and in the process of rotation from 360 degrees to 0 degrees (sequentially from another rotation direction of FIG. 19 to FIG. 17), the first shaft 320 is more likely to cause rotation. Therefore, the double-axis hinge structure 300 of the third embodiment, when applied to a foldable electronic device, may provide the start angle at the moment when the user is about to open the screen (for example, from 0 degrees to 24 degrees) and close the screen (for example, from 360 degrees to 336 degrees). Execution by using one hand and/or small force is allowed, and different handfeels are provided.

Specifically, in the process of the double-axis hinge structure 300 rotating from the initial mode in FIG. 17 to another mode in FIG. 18, first, the second shaft 340, which easily rotates, rotates a certain amount of rotation (for example, 24 degrees) toward the negative x-axis relative to the fixing member 310, and at the same time, the pushing portion 362B moves along the x-axis from a side S1 of the sliding groove 362A to another side S2 of the sliding groove 362A. Up to this point, the first shaft 320 has not rotated. In other words, the difference in the sliding distance of the pushing portion 362B relative to the sliding groove 362A causes an idle stroke of the second slide guiding member 360B, which is thus unable to drive the first slide guiding member 360A. In practical applications, when the second shaft 340 and the first shaft 320 are respectively installed on the screen side and the base unit side of the foldable electronic device, the idle stroke of the second slide guiding member 360B allows the user to use one hand and/or a small force at the moment when the user opens the screen. Afterwards, preferably, the user uses both hands to apply force evenly to flip the screen side and the base unit side. Next, once the rotation of the second shaft 340 exceeds the certain amount of rotation (that is, the aforementioned 24 degrees), the pushing portion 362B continues to abut against said another side S2 (as shown in FIG. 18) of the sliding groove 362A. At this moment, the second slide guiding member 360B and the first slide guiding member 360A start to mutually push so that the second slide guiding member 360B and the first slide guiding member 360A slide along a positive x-axis relative to the second shaft 340 and the first shaft 320, so that the first shaft 320 and the second shaft 340 rotate in opposite directions and operate with a difference in the amount of rotation until another mode shown in FIG. 18 is reached.

It is to be noted that, the second shaft 340 in FIG. 18 first rotates a preset 90 degrees toward the negative x-axis, but the first shaft 320 only rotates 66 degrees toward the positive x-axis and needs to further rotate 24 degrees before it rotates to the preset 90 degrees. In the process of the first shaft 320 rotating from 66 degrees to the preset 90 degrees, the first slide guiding member 360A continues to move along with the sliding groove 362A along the positive x-axis (the second slide guiding member 360B does not move at this point) until the side S1 (as shown in FIG. 19) of the sliding groove 362A abuts against the pushing portion 362B. Next, once the first shaft 320 rotates the preset 90 degrees, the side S1 of the sliding groove 362A continues to abut against the pushing portion 362B. At this moment, the first slide guiding member 360A and the second slide guiding member 360B start to mutually push so that the first slide guiding member 360A and the second slide guiding member 360B continue to slide along the positive x-axis relative to the first shaft 320 and the second shaft 340, so that the first shaft 320 and the second shaft 340 rotate in opposite directions and operate with a difference in the amount of rotation until yet another mode shown in FIG. 19 is reached.

Conversely, to reset the double-axis hinge structure 300 from yet another mode in FIG. 19 to another mode in FIG. 18, the first shaft 320, which easily rotates, first rotates a certain amount of reverse rotation (for example, −24 degrees) relative to the fixing member 310 toward the negative x-axis, and at the same time, the sliding groove 362A moves along the negative x-axis until the other side S2 of the sliding groove 362A abuts against the pushing portion 362B. Up to this point, the second shaft 340 has not rotated and the first slide guiding member 360A has an idle stroke and cannot push the second slide guiding member 360B. In this way, in practical applications, this allows the user to close the screen in the 360 mode with one hand and/or with less force at the moment of closing the screen. Next, as long as the rotation of the first shaft 320 exceeds the certain amount of reverse rotation (that is, the aforementioned −24 degrees), the other side S2 (the position as shown in FIG. 18) of the sliding groove 362A continues to abut against the pushing portion 362B. At this moment, the first slide guiding member 360A and the second slide guiding member 360B start to mutually push so that the first slide guiding member 360A and the second slide guiding member 360B slide together along a negative x-axis relative to the second shaft 340 and the first shaft 320, so that the first shaft 320 and the second shaft 340 rotate in opposite directions and operate with a difference in the amount of rotation until they are reset to another mode shown in FIG. 18.

In FIG. 18 after the reset, the first shaft 320 first rotates toward the negative x-axis to the preset −90 degrees, but the second shaft 340 only rotates to the positive x-axis at −66 degrees and needs to further rotate −24 degrees before it rotates to the preset −90 degrees. In the process of the second shaft 340 rotating from −66 degrees to the preset −90 degrees process, the second slide guiding member 360B continues to move along the negative x-axis (the first slide guiding member 360A does not move at this point) along with the pushing portion 362B from the other side S2 of the sliding groove 362A until it abuts against the side S1 (the position as shown in FIG. 17) of the sliding groove 362A. Next, once the rotation of the second shaft 340 reaches the preset −90 degree, the pushing portion 362B continues to abut the side S1 of the sliding groove 362A. At this moment, the first slide guiding member 360A and the second slide guiding member 360B mutually push so that the first slide guiding member 360A and the second slide guiding member 360B continue to slide along a negative x-axis relative to the first shaft 320 and the second shaft 340, so that the first shaft 320 and second shaft 340 rotate in opposite directions and are reset to the initial mode as shown in FIG. 17.

The double-axis hinge structure 300 further includes a first connection member 370, a second connection member 380, another fixing member 390, and a torsional component 395.

The first shaft 320 has a first engaging surface 321, and the first connection member 370 is engaged with the first engaging surface 321 of the first shaft 320 to synchronously rotate with the first shaft 320. The second shaft 340 has a second engaging surface 341, and the second connection member 380 is engaged with the second engaging surface 341 of the second shaft 340 to synchronously rotate with the second shaft 340.

The first slide guiding member 360A has a fifth guiding portion 363A, and the second slide guiding member 360B has a sixth guiding portion 363B. The first connection member 370 has a seventh guiding portion 371 corresponding to the fifth guiding portion 363A, and the second connection member 380 has an eighth guiding portion 381 corresponding to the sixth guiding portion 363B. In this embodiment, the first guiding portion 330, the second guiding portion 350, the third guiding portion 361A, the fourth guiding portion 361B, the fifth guiding portion 363A, the sixth guiding portion 363B, the seventh guiding portion 371, and the eighth guiding portion 381 are respectively a helical guiding surface. Here, the helical guiding surfaces are defined as guiding surfaces surrounding their respective shaft in a helical pattern. Taking the content shown in the figures as an example, the helical guiding surfaces surround the x-axis in a helical pattern.

The first slide guiding member 360A is located between the first guiding portion 330 and the first connection member 370, and the second slide guiding member 360B is located between the second guiding portion 350 and the second connection member 380. It should be noted that, like the first embodiment, the third embodiment allows the first connection member 370 and the second connection member 380 to rotate on the x-axis in opposite directions respectively along with the first shaft 320 and the second shaft 340, but do not move on the x-axis.

The first shaft 320 and the second shaft 340 pass through said another fixing member 390. The first slide guiding member 360A and the second slide guiding member 360B are located between the fixing member 310 and said another fixing member 390, and the first slide guiding member 360A and the second slide guiding member 360B are adapted for sliding between the fixing member 310 and said another fixing member 390.

The first shaft 320 and the second shaft 340 pass through the torsional component 395. The first slide guiding member 360A and the second slide guiding member 360B are located between the fixing member 310 and the torsional component 395, and the torsional component 395 provides the torque for rotation of the first shaft 320 and the second shaft 340.

In summary, the double-axis hinge structure of the disclosure does not require four gears as in the traditional way, so it has a smaller volume, which reduces the volume of the foldable electronic device that is applied.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. A double-axis hinge structure, comprising:
   a fixing member;
   a first shaft, passing through the fixing member;
   a first guiding portion, integrally formed on the first shaft;
   a second shaft, passing through the fixing member, disposed side by side with the first shaft;
   a second guiding portion, integrally formed on the second shaft; and
   a slide guiding member, wherein the first shaft and the second shaft pass through the slide guiding member, and the slide guiding member has a third guiding portion matched with the first guiding portion and a fourth guiding portion matched with the second guiding portion,
   wherein when one or both of the first shaft and the second shaft rotate relative to the fixing member, the slide guiding member is driven to slide relative to the first shaft and the second shaft through the guidance and matching between the first guiding portion and the third guiding portion and/or between the second guiding portion and the fourth guiding portion, so that the first shaft and the second shaft synchronously rotate in opposite directions by the same amount of rotation,
   wherein the first guiding portion, the second guiding portion, the third guiding portion, and the fourth guiding portion are respectively a helical guiding surface.

2. The double-axis hinge structure according to claim 1, further comprising:
   a first connection member, connected to the first shaft, wherein the slide guiding member is located between the first guiding portion and the first connection member; and
   a second connection member, connected to the second shaft, wherein the slide guiding member is located between the second guiding portion and the second connection member,
   wherein the slide guiding member has a fifth guiding portion and a sixth guiding portion, the first connection member has a seventh guiding portion corresponding to the fifth guiding portion, and the second connection member has an eighth guiding portion corresponding to the sixth guiding portion.

3. The double-axis hinge structure according to claim 2, wherein the fifth guiding portion, the sixth guiding portion, the seventh guiding portion and the eighth guiding portion are respectively a helical guiding surface.

4. The double-axis hinge structure according to claim 1, further comprising:
   another fixing member, wherein the first shaft and the second shaft pass through the another fixing member, the slide guiding member is located between the fixing member and the another fixing member, and the slide guiding member is adapted for sliding between the fixing member and the another fixing member.

5. The double-axis hinge structure according to claim 1, further comprising:
   a torsional component, wherein the first shaft and the second shaft pass through the torsional component, and the slide guiding member is located between the fixing member and the torsional component.

6. A double-axis hinge structure, comprising:
   a fixing member;
   a first shaft, passing through the fixing member;
   a first guiding portion, integrally formed on the first shaft;
   a second shaft, passing through the fixing member, disposed side by side with the first shaft;
   a second guiding portion, integrally formed on the second shaft;
   a first slide guiding member, wherein the first shaft passes through the first slide guiding member, and the first slide guiding member has a third guiding portion matched with the first guiding portion and a sliding groove; and
   a second slide guiding member, wherein the second shaft passes through the second slide guiding member, the second slide guiding member has a fourth guiding portion matched with the second guiding portion and a pushing portion corresponding to the sliding groove, and the pushing portion is slidably disposed in the sliding groove,
   wherein when one or both of the first shaft and the second shaft rotate relative to the fixing member, the pushing portion moves from a side of the sliding groove until it abuts against another side of the sliding groove, and one or both of the first shaft and the second shaft continue to rotate, so that the first slide guiding member and the second slide guiding member mutually push to drive the first slide guiding member and the second slide guiding member to slide relative to the first shaft and the second shaft, so that the first shaft and the second shaft rotate in opposite directions, and there is a difference between an amount of rotation of the first shaft and an amount of rotation of the second shaft.

7. The double-axis hinge structure according to claim 6, wherein the first guiding portion, the second guiding portion, the third guiding portion, and the fourth guiding portion are respectively a helical guiding surface.

8. The double-axis hinge structure according to claim 7, further comprising:

a first connection member, connected to the first shaft, wherein the first slide guiding member is located between the first guiding portion and the first connection member; and a second connection member, connected to the second shaft, wherein the second slide guiding member is located between the second guiding portion and the second connection member, wherein the first slide guiding member has a fifth guiding portion and the second slide guiding member has a sixth guiding portion, the first connection member has a seventh guiding portion corresponding to the fifth guiding portion, and the second connection member has an eighth guiding portion corresponding to the sixth guiding portion.

9. The double-axis hinge structure according to claim 8, wherein the fifth guiding portion, the sixth guiding portion, the seventh guiding portion, and the eighth guiding portion are respectively a helical guiding surface.

10. The double-axis hinge structure according to claim 6, further comprising:
   another fixing member, wherein the first shaft and the second shaft pass through the another fixing member, the first slide guiding member and the second slide guiding member are located between the fixing member and the another fixing member, and the first slide guiding member and the second slide guiding member are adapted for sliding between the fixing member and the another fixing member.

11. The double-axis hinge structure according to claim 6, further comprising:
   a torsional component, wherein the first shaft and the second shaft pass through the torsional component, and the first slide guiding member and the second slide guiding member are located between the fixing member and the torsional component.

12. A double-axis hinge structure, comprising:
   a fixing member;
   a first shaft, passing through the fixing member;
   a first guiding portion, integrally formed on the first shaft;
   a second shaft, passing through the fixing member, disposed side by side with the first shaft;
   a second guiding portion, integrally formed on the second shaft; and
   a slide guiding member, wherein the first shaft and the second shaft pass through the slide guiding member, and the slide guiding member has a third guiding portion matched with the first guiding portion and a fourth guiding portion matched with the second guiding portion,
   wherein when one or both of the first shaft and the second shaft rotate relative to the fixing member, the slide guiding member is driven to slide relative to the first shaft and the second shaft through the guidance and matching between the first guiding portion and the third guiding portion and/or between the second guiding portion and the fourth guiding portion, so that the first shaft and the second shaft synchronously rotate in opposite directions by the same amount of rotation,
   wherein the first guiding portion and the second guiding portion are respectively a helical convex portion, and the third guiding portion and the fourth guiding portion are respectively a helical groove.

13. The double-axis hinge structure according to claim 12, wherein the slide guiding member has a first shaft hole and a second shaft hole, the third guiding portion is located in the first shaft hole, and the fourth guiding portion is located in the second shaft hole.

14. The double-axis hinge structure according to claim 12, wherein the first shaft has a first positioning portion, the second shaft has a second positioning portion, the first positioning portion is located between the fixing member and the first guiding portion, and the second positioning portion is located between the fixing member and the second guiding portion.

15. The double-axis hinge structure according to claim 12, further comprising:
   another fixing member, wherein the first shaft and the second shaft pass through the another fixing member, the slide guiding member is located between the fixing member and the another fixing member, and the slide guiding member is adapted for sliding between the fixing member and the another fixing member.

16. The double-axis hinge structure according to claim 12, further comprising:
   a torsional component, wherein the first shaft and the second shaft pass through the torsional component, and the slide guiding member is located between the fixing member and the torsional component.

* * * * *